United States Patent
Kean

(10) Patent No.: US 11,377,820 B2
(45) Date of Patent: Jul. 5, 2022

(54) AUTOMATED WORK VEHICLE CONTROL SYSTEM USING POTENTIAL FIELDS

(71) Applicant: Deere & Company, Moline, IL (US)

(72) Inventor: Michael G. Kean, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 879 days.

(21) Appl. No.: 15/380,755

(22) Filed: Dec. 15, 2016

(65) Prior Publication Data
US 2018/0171590 A1 Jun. 21, 2018

(51) Int. Cl.
*E02F 9/20* (2006.01)
*E02F 3/43* (2006.01)
(Continued)

(52) U.S. Cl.
CPC .............. *E02F 9/205* (2013.01); *E02F 3/434* (2013.01); *G05D 1/0217* (2013.01); *E02F 3/34* (2013.01); *G05D 2201/0202* (2013.01)

(58) Field of Classification Search
CPC ... E02F 9/205; E02F 3/434; E02F 3/34; E02F 3/435; E02F 3/437; E02F 9/2203; E02F 9/22; G05D 1/0217; G05D 2201/0202; G05D 1/028; G05D 1/0276; Y10T 74/20201; B60C 23/0437; B60C 23/045; G01R 15/148; G01R 15/18; G01R 15/20;
(Continued)

(56) References Cited

U.S. PATENT DOCUMENTS 5,758,298 A * 5/1998 Guldner ................ G01S 15/931
318/580
6,167,336 A 12/2000 Singh et al.
(Continued)

FOREIGN PATENT DOCUMENTS

KR 101572759 B1 11/2015
KR 20150122895 A 11/2015

OTHER PUBLICATIONS

Andrea Mooiola, Vector Calculus, Sep. 19, 2016, University of Reading.*
(Continued)

*Primary Examiner* — Christian Chace
*Assistant Examiner* — Aaron C Smith
(74) *Attorney, Agent, or Firm* — Klintworth & Rozenblat IP LLP

(57) ABSTRACT

An automated control system in a work vehicle for automating operation of a task is provided. The control system includes one or more electronic controllers having processing and memory architecture including a potential field module and an actuator control module. The potential field module includes a state determination unit configured to determine a state of the work vehicle based on input data; a potential field function selection unit configured to select at least one potential field function based on the determined state; vector calculation unit configured to calculate an action vector based on the at least one potential field function; and an action unit configured to generate an actuator command based on the action vector. The actuator control module is configured to receive the actuator command and to generate command signals for at least one actuator of the work vehicle to, at least in part, perform the task.

14 Claims, 8 Drawing Sheets

(51) Int. Cl.
*G05D 1/02* (2020.01)
*E02F 3/34* (2006.01)

(58) Field of Classification Search
CPC ........ G01R 15/24; G01R 15/26; G01R 29/08; G01V 3/08; G01V 3/081; G01V 3/087; G05B 2219/40474; H02K 41/00; H01L 29/82; Y02A 90/344
See application file for complete search history.

(56) References Cited

U.S. PATENT DOCUMENTS

| | | | | |
|---|---|---|---|---|
| 2003/0014165 | A1* | 1/2003 | Baker | G05D 1/104 |
| | | | | 701/3 |
| 2007/0260380 | A1* | 11/2007 | Mintah | E02F 9/2029 |
| | | | | 701/50 |
| 2011/0178669 | A1* | 7/2011 | Tanaka | G05D 1/0272 |
| | | | | 701/25 |
| 2012/0016557 | A1 | 1/2012 | Verboomen | |
| 2013/0231855 | A1 | 9/2013 | Mcaree et al. | |
| 2014/0222247 | A1* | 8/2014 | Friend | G05D 1/0276 |
| | | | | 701/2 |
| 2014/0303814 | A1* | 10/2014 | Burema | A01B 79/005 |
| | | | | 701/3 |
| 2017/0218594 | A1* | 8/2017 | Padilla | E02F 9/2037 |

OTHER PUBLICATIONS

R. Siegwart et al., Potential Fields, Oct. 16, 2008.
Benjamin Kuipers, Lecture 7: Potential Fields and Model Predictive Control—CS 344R: Robotics, Potential Fields, Oussama Khatib, 1986.
Jia Pan et al., g-Planner: Real-Time Motion Planning and Global Navigation using GPUs, Dept. of Computer Science, Univ. of North Carolina at Chapel Hill, 2010.
J. Barraquand, Numerical Potential Field Techniques for Robot Path Planning, Advanced Robotics, 1991, 'Robots in Unstructured Environments', 91 ICAR., Fifth International Conference, Jun. 1991.
Oussama Khatib, Real-Time Obstacle Avoidance for Manipulators and Mobile Robots, The International Journal of Robotics Research, vol. 5, No. 1, Spring 1986.
Ahmed Badawy, Abstract: Manipulator Trajectory Planning Using Artificial Potential Field, Engineering and Technology (ICET), 2014 International Conference, Apr. 2014.
Howie Choset et al., Presentation: Robotic Motion Planning: Potential Functions, Robotics Institute 16-735, http://voronoi.sbp.ri.cmu.edu/~motion and http://voronoi.sbp.ri.cmu.edu/~choset, date unknown.
Michael A. Goodrich, Presentation: Potential Fields Tutorial, date unknown.
Johan Hagelback, Using Potential Fields in a Real-time Strategy Game Scenario (Tutorial), AiGameDev.com @ http://aigamedev.com/open/tutorials/potential-fields/, Jan. 31, 2009.

* cited by examiner

AUTOMATED WORK VEHICLE CONTROL SYSTEM USING POTENTIAL FIELDS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and improving automated work vehicle operation.

BACKGROUND OF THE DISCLOSURE

In the construction, agricultural, and forestry industries, various work vehicles or machines, such as loaders, may be utilized in interactions with various types of materials and the surrounding environment. In one example, a loader may include a bucket pivotally coupled by a boom assembly to a frame with hydraulic cylinders coupled to the boom and/or the bucket to move the bucket between positions relative to the frame to load the bucket with material.

Typically, the work vehicle may perform various tasks within a work environment, such as, in the example of a loader, maneuvering the vehicle to a pile of material, filling the bucket with material, maneuvering the vehicle to an unloading position, and dumping the loaded material. Operators may attempt to improve efficiency, for example, by attempting to automate these tasks. However, automation in a changing environment, such as a work site, may be challenging.

SUMMARY OF THE DISCLOSURE

The disclosure provides a work vehicle control system using potential fields to automate various aspects of the work vehicle operation.

In one aspect the disclosure provides an automated control system in a work vehicle for automating operation of a task. The control system includes one or more electronic controllers having processing and memory architecture including a potential field module and an actuator control module. The potential field module includes a state determination unit configured to determine a state of the work vehicle based on input data; a potential field function selection unit in communication with the state determination unit and configured to select at least one potential field function based on the determined state; vector calculation unit in communication with the potential field function selection unit and configured to calculate an action vector based on the at least one potential field function; and an action unit in communication with the vector calculation unit and configured to generate an actuator command based on the action vector. The actuator control module is in communication with the potential field module and is configured to receive the actuator command and to generate command signals for at least one actuator of the work vehicle to, at least in part, perform the task.

In another aspect the disclosure provides a work vehicle with a frame; a propulsion system coupled to the frame and configured to move the work vehicle; an implement arrangement coupled to the frame and configured to manipulate a material; and an electronic control system having processing and memory architecture operatively coupled to the propulsion system and the implement arrangement and configured to generate an actuator command to at least one of the propulsion system and the implement arrangement to perform a task. The control system includes a potential field module with a state determination unit configured to determine a state of the work vehicle based on input data; a potential field function selection unit in communication with the state determination unit and configured to select at least one potential field function based on the state; a vector calculation unit in communication with the potential field function selection unit and configured to calculate an action vector based on the at least one potential field function; and an action unit in communication with the vector calculation unit and configured to generate the actuator command based on the action vector The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
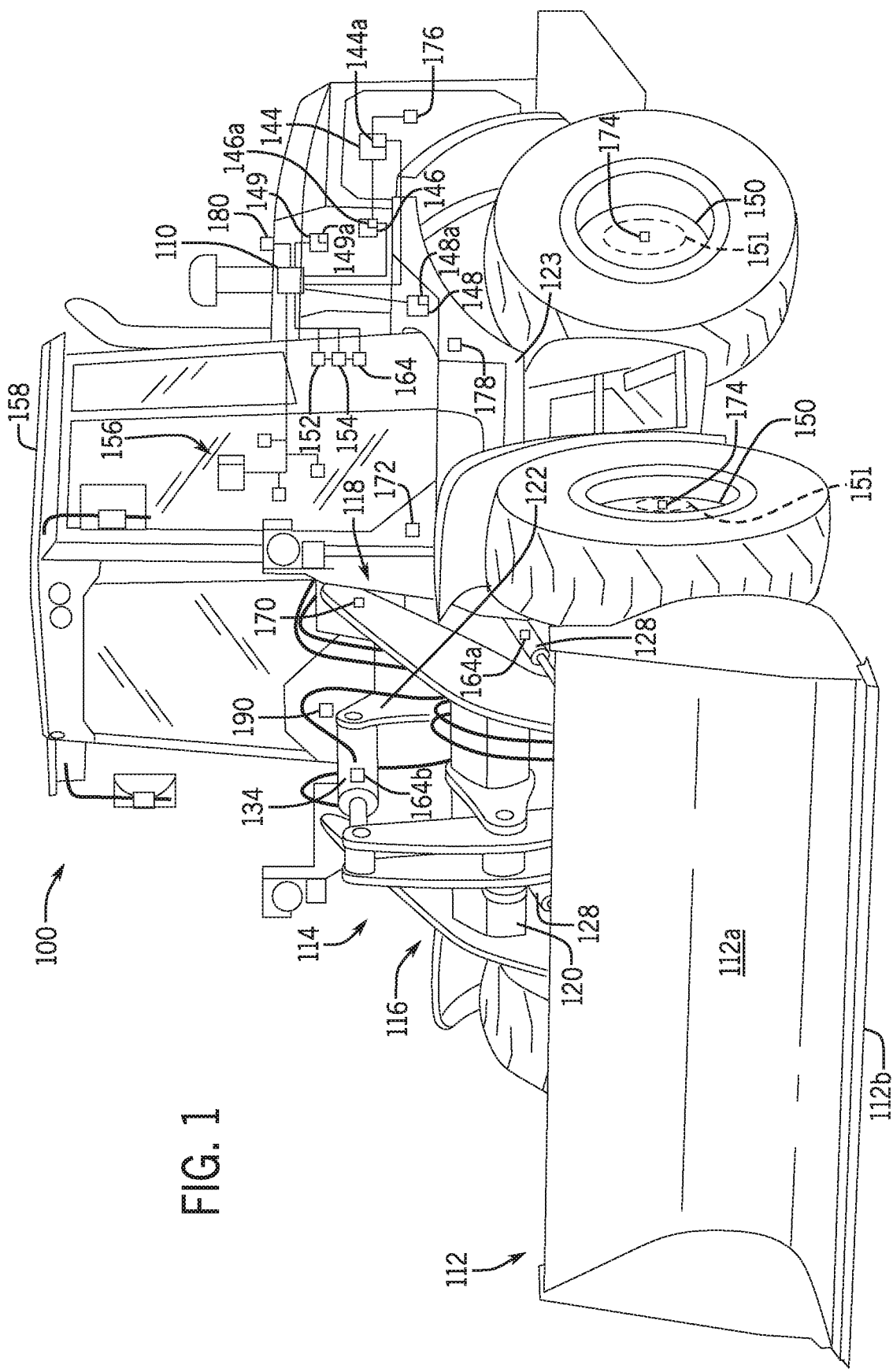
FIG. 1 is a perspective view of an example work vehicle in the form of a wheel loader in which the disclosed automated system using potential fields may be used.

The following describes one or more example embodiments of the disclosed potential fields based automated work vehicle control system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the loader described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system and method for improving automated work vehicle operation as shown in the accompanying figures of the drawings described briefly above. Generally, the disclosed control systems and methods (and work vehicles in which they are implemented) provide for improved automated operation to perform various tasks as compared to conventional systems by using potential fields to navigate within the vehicle environment, manipulate material with the implement, avoid obstacles, and/or other work functions. This operation improves efficiency and safety.

The disclosed control system may be utilized with regard to various machines or work vehicles, including loaders and other machines for lifting and moving various materials, for example, various machines used in the agriculture, construction and forestry industries.

As introduced above, the disclosed systems and methods implement potential fields for automated operation. Generally, potential field machine operation is a control logic concept of artificial intelligence to drive machine behavior in the absence of hard-coded, specific rules or models. In one embodiment, such operation may be implemented in a work vehicle to drive one or more behaviors of one or more components of the work vehicle to result in desirable functions and/or overall tasks. In one implementation, various work site elements (e.g., obstacles, materials, other vehicles, etc.) at stationary or moving positions within an environment may be represented by potential fields that indicate appropriate work vehicle behavior characteristics based on the element. For each element, the potential field may be represented as a function that expresses potential in view of a spatial relationship between the element and the work vehicle. Generally, the spatial relationship of the potential field function refers to the distance between one or more aspects the work vehicle and the element, including distances in one, two, or three-dimensions. Such potential field functions may be considered with respect to the entire work vehicle (e.g., in the context of moving across the environment) or only a portion of the work vehicle (e.g., manipulating a material with an implement). Each instance of "potential" may be considered an action vector (or an action vector component when considering multiple fields) that provide guidance to the vehicle regarding appropriate automated action. In artificial terms, an action vector may be considered a force acting upon the vehicle to advance performance of the task by encouraging desired behavior (e.g., toward a desired position or action, or away from an undesired position or action). An action vector (and thus, potential) may be positive, representing an attractive response, or negative, representing a repulsive response. In one example, the action vector may have a magnitude representing the relative strength of the potential and a direction representing the orientation and sign of the potential for the work vehicle based on the element. From an overall or plan view, the potential field function of action vectors across an array of distances in the environment may appear similar to potential lines for an electrical or magnetic field that radiate outwardly from the corresponding element, although action vectors may be considered with respect to all three dimensions. When expressed in this manner, the potential field function may be considered a potential field map.

As such, for each position or other state of the machine, the control system calculates the action vector as the summation of vector components of appropriately selected potential field functions representing the various behaviors in the environment. Subsequently, the machine implements the action vector by generating an actuator command, e.g., moving toward a goal or away form an obstacle.

In mathematical terms, a potential field function U(q) for a vehicle at point q relative to an element with one attractive behavior as a "goal" (generally, with positive values) and for multiple elements with repulsive behaviors as "obstacles" (generally, with negative values) may be represented by the following expression (1):

$$U(q) = U_{goal}(q) + \Sigma U_{obstacle}(q) \tag{1}$$

The resulting action vector for each point q may be considered the gradient of the potential field, which may be expressed by the following expression (2):

$$F(q) = -\nabla U(q) = F_{att}(q) + F_{rep}(q) = -\nabla U_{att}(q) - \nabla U_{rep}(q) \tag{2}$$

The potential field functions may be implemented in any number of different ways to define the influence of the behaviors on the vehicle in view of the elements over a relative distance. For example, the potential field functions may represent Euclidean distances between the vehicle (or vehicle component) and element and/or converge linearly or in some other manner to the source position. Various schemas may be implemented. Generally, a control system iteratively or continuously makes these determinations in real time in order to progress to completion of an overall task. Generally, the control system determines the current state, selects one or more potential field functions based on the state, and calculates the action vector based on the potential field functions to, in effect, determine and implement the action with the highest potential. Over time, resulting behavior to perform the task emerges in a manner difficult or impossible to hard code or model beforehand. More specific examples of implementation of the potential field machine operation will be provided below.

Potential fields are discussed below with reference to a work vehicle performing one or more tasks. As used herein, the term "task" may refer to one task or a collection of tasks to perform an overall work function, and each task may be associated with one or more behaviors that may be represented by potential field functions selected based on the state of the work vehicle. As used herein, the term "state" may refer to the conditions or circumstances of the work vehicle at a particular point in time in view of the task. The state may be determined based on various input parameters, such as relative and absolute positions of the work vehicle and other elements in the environment; and/or implement, load, material and fleet status.

As one example, a work vehicle may be assigned the task of moving material in an environment from a loading position to an unloading position. Depending on the vehicle state, this task may involve one or more of the following: navigating and moving through the environment from a current position to the loading position while avoiding obstacles; at the loading position, collecting material, such as by scooping the material in a bucket; upon collecting sufficient material, navigating and moving through the environment from a current position to the unloading position while avoiding obstacles; and at the unloading position, depositing the material. Subsequently, the work vehicle may repeat the series of tasks, or undertake additional tasks.

Referring to FIG. 1, one embodiment of a wheel or track loader work vehicle 100 includes a vehicle control system 110 operating based on potential fields to at least partially control operation, including movement of the overall work vehicle 100, and/or manipulation of various components, such as operation of an end implement, which in this example is a scoop or bucket 112. It will be understood that the configuration of the work vehicle 100 is presented as an example only. In this regard, the disclosed control system 110 may be implemented with a front loader attachment fixed or removably coupled to an otherwise non-loader work vehicle, such as a tractor. As described below, certain functions to the control system 110 may be automated such that one or more aspects of the control system 110 may be considered an automated control system, specific portions of which are described below. Additional details about the control system 110 will be provided after a description of various other components of the work vehicle 100.

Figure 2:
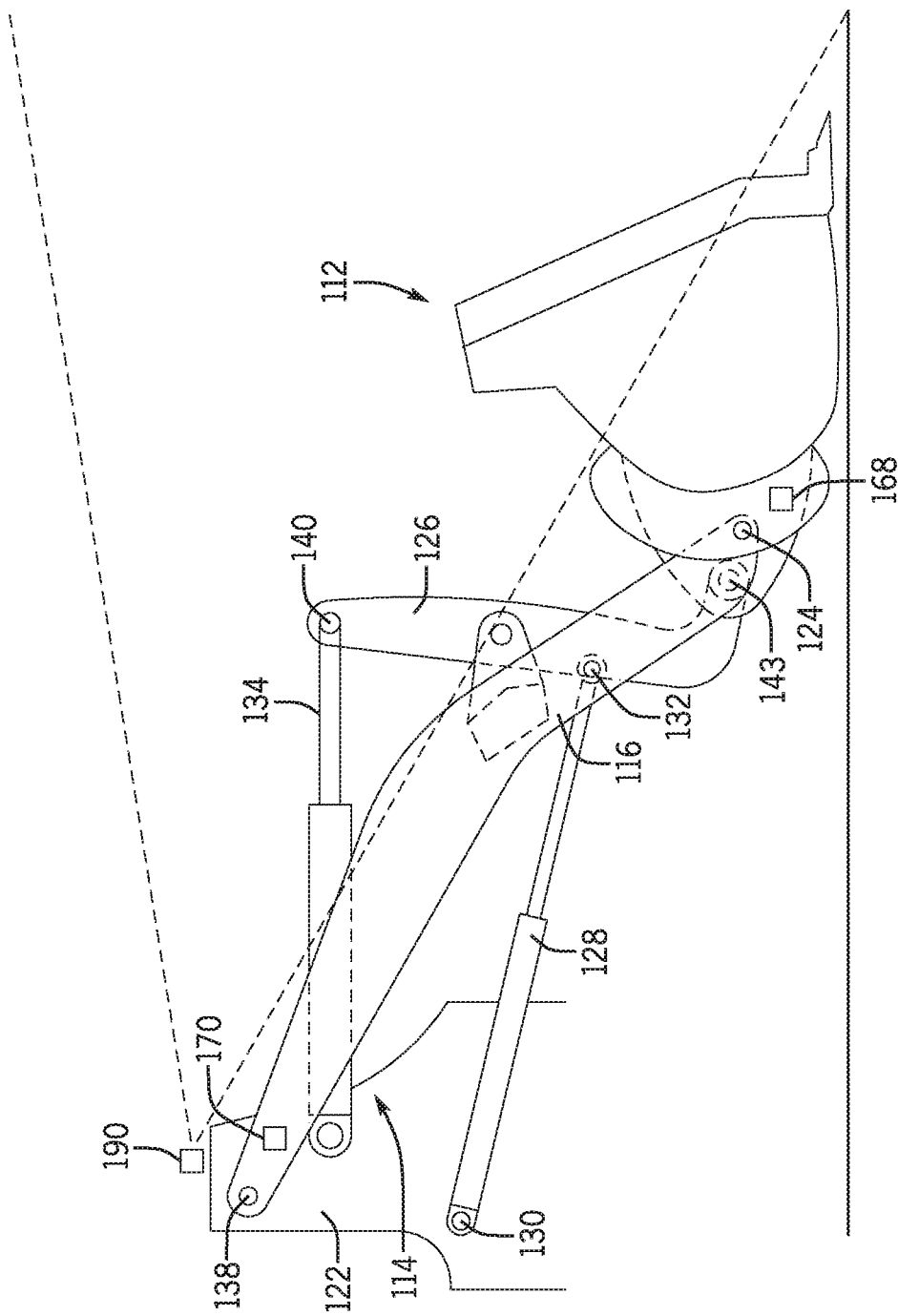
FIG. 2 is a side view of a boom assembly and bucket of the work vehicle of FIG. 1.

In the embodiment depicted, the bucket 112 is pivotally mounted to a boom assembly 114. Generically, the bucket 112 and/or boom assembly 114 may be considered an implement arrangement. In this example, the boom assembly 114 includes a first boom 116 and a second boom 118, which are interconnected via a crossbeam 120 to operate in parallel. Reference is additionally made to FIG. 2, which is a partial side view of the boom assembly 114. Each of the first boom 116 and the second boom 118 are coupled to a frame portion 122 of a frame 123 of the work vehicle 100 at a first end, and are coupled at a second end to the bucket 112 via a respective one of a first pivot linkage 124 and a second pivot linkage (not shown).

One or more hydraulic cylinders 128 are mounted to the frame portion 122 and to the boom assembly 114, such that the hydraulic cylinders 128 may be driven or actuated in order to move or raise the boom assembly 114 relative to the work vehicle 100. Generally, the boom assembly 114 includes two hydraulic cylinders 128, one coupled between the frame portion 122 and the first boom 116; and one coupled between the frame portion 122 and the second boom 118. It should be noted, however, that the work vehicle 100 may have any number of hydraulic cylinders, such as one, three, etc. Each of the hydraulic cylinders 128 includes an end mounted to the frame portion 122 at a pin 130 and an end mounted to the respective one of the first boom 116 and the second boom 118 at a pin 132 (FIG. 2). Upon activation of the hydraulic cylinders 128, the boom assembly 114 may be moved between various positions to elevate the boom assembly 114, and thus, the bucket 112 relative to the frame 123 of the work vehicle 100.

One or more hydraulic cylinders 134 are mounted to the frame portion 122 and a pivot linkage 126. Generally, the work vehicle 100 includes a single hydraulic cylinder 134 associated with the pivot linkage 126. In this example, the hydraulic cylinder 134 includes an end mounted to the frame portion 122 at a pin 138 and an end mounted to the pivot linkage 126 at a pin 140. Upon activation of the hydraulic cylinder 134, the bucket 112 may be moved between various positions to pivot the bucket 112 relative to the boom assembly 114. Thus, in the embodiment depicted, the bucket 112 is pivotable about the boom assembly 114 by the hydraulic cylinder 134. Generally, the control system 110 disclosed herein may be applied with respect to any type of actuator capable of producing relative movement of an implement and/or overall movement of the work vehicle 100.

Thus, it will be understood that the configuration of the bucket 112 is presented as an example only. In this regard, a hoist boom (e.g. the boom assembly 114) may be generally viewed as a boom that is pivotally attached to a vehicle frame, and that is also pivotally attached to an end effector. Similarly, a pivoting linkage (e.g., the pivot linkage 126) may be generally viewed as a pin or similar feature effecting pivotal attachment of a receptacle (e.g. bucket 112) to a vehicle frame. In this light, a tilt actuator (e.g., the hydraulic cylinders 134) may be generally viewed as an actuator for pivoting a receptacle with respect to a hoist boom, and the hoist actuator (e.g. the hydraulic cylinders 128) may be generally viewed as an actuator for pivoting a hoist boom with respect to a vehicle frame.

With additional reference to FIG. 2, the bucket 112 is coupled to the pivot linkage 126 via a coupling pin 143. The coupling pin 143 cooperates with the pivot linkage 126 to enable the movement of the bucket 112 upon activation of the hydraulic cylinder 134. As will be discussed further herein, the bucket 112 is movable upon activation of the hydraulic cylinder 134 between various unloaded, loaded, and dumping positions. In the first, unloaded position, the bucket 112 is capable of receiving various materials. In the second, loaded position, the bucket 112 is pivoted upward or relative to the horizontal by the actuation of the hydraulic cylinder 134 such that the bucket 112 is loaded with and retains the various materials. In the third, dump position, the bucket 112 is pivoted downward relative to the horizontal by the actuation of the hydraulic cylinder 134 such that the bucket 112 empties the material. With reference to FIG. 2, the bucket 112 generally defines a container 112a for the receipt of various materials, such as dirt, rocks, wet dirt, sand, hay, etc. The bucket 112 may include an elongated side wall edge 112b to direct material into the container 112a.

The work vehicle 100 includes a propulsion system that supplies power to move the work vehicle 100. The propulsion system includes an engine 144 and a transmission 146. The engine 144 supplies power to a transmission 146. In one example, the engine 144 is an internal combustion engine, such as the diesel engine, that is controlled by an engine control module 144*a*. The engine control module 144*a* receives one or more control signals or control commands from the control system 110 to adjust a power output of the engine 144. It should be noted that the use of an internal combustion engine is merely an example, as the propulsion device can be a fuel cell, an electric motor, a hybrid-gas electric motor, etc.

The transmission 146 transfers the power from the engine 144 to a suitable driveline coupled to one or more driven wheels 150 (and tires) of the work vehicle 100 to enable the work vehicle 100 to move. As is generally known, the transmission 146 can include a suitable gear transmission, which can be operated in a variety of ranges containing one or more gears, including, but not limited to a park range, a neutral range, a reverse range, a drive range, a low range, and the like based on signals from a transmission control module 146*a* in communication with the control system 110.

The work vehicle 100 also includes a steering system 148. As is generally known, the steering system 148 includes various linkages, levers, joins, gears, pins, rods, and the like to position one or more driven wheels 150 to orient the work vehicle 100 in the desired direction. The steering system 148 may operate based on signals from a steering control module 148*a* in communication with the control system 110.

The work vehicle 100 also includes a braking system 149. As is generally known, the braking system 149 includes one or more brakes 151, which are associated with a respective one of the driven wheels 150. The brakes 151 can comprise a drum brake, a disc brake, or any suitable assembly for slowing or stopping the rotation of the respective driven wheel 150 based on the receipt of one or more control signals from a braking control module 149*a* in communication with the control system 110.

The work vehicle 100 also includes one or more pumps 152, which may be driven by the engine 144 of the work vehicle 100. Flow from the pumps 152 may be routed through various control valves 154 and various conduits (e.g., flexible hoses and lines) in order to drive the hydraulic cylinders 128, 134. Flow from the pumps 152 may also power various other components of the work vehicle 100. The flow from the pumps 152 may be controlled in various ways (e.g., through control of the various control valves 154), in order to cause movement of the hydraulic cylinders 128, 134, and thus, the bucket 112 relative to the work vehicle 100. In this way, for example, a movement of the boom assembly 114 and/or bucket 112 between various positions relative to the frame 123 of the work vehicle 100 may be implemented by various control signals to the pumps 152, control valves 154, and so on.

Generally, as noted above, the control system 110 may be provided to control various aspects of the operation of the work vehicle 100. The control system 110 may be configured as a computing device with associated processor devices and memory architectures, as a hard-wired computing circuit (or circuits), as a programmable circuit, as a hydraulic, electrical or electro-hydraulic controller, or otherwise. As such, the control system 110 may be configured to execute various computational and control functionality with respect to the work vehicle 100 (or other machinery). In some embodiments, the control system 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the control system 110 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The control system 110 may be in electronic, hydraulic, mechanical, or other communication with various other systems or devices of the work vehicle 100 (or other machinery). For example, the control system 110 may be in electronic or hydraulic communication with various actuators, sensors, and other devices within (or outside of) the work vehicle 100, including various devices associated with the pumps 152, control valves 154, and so on. The control system 110 may communicate with other systems or devices (including other controllers) in various known ways, including via a CAN bus (not shown) of the work vehicle 100, via wireless or hydraulic communication means, or otherwise. An example location for the control system 110 is depicted in FIG. 1. It will be understood, however, that other locations are possible including other locations on the work vehicle 100, or various remote locations.

In some embodiments, the control system 110 may be configured to receive input commands and to interact with an operator via a human-machine interface 156, which may be disposed inside a cab 158 of the work vehicle 100 for easy access by the operator. The human-machine interface 156 may be configured in a variety of ways. In some embodiments, the human-machine interface 156 may include one or more joysticks, various switches or levers, one or more buttons, a touchscreen interface that may be overlaid on a display, a keyboard, an audible device, a microphone associated with a speech recognition system, or various other human-machine interface devices. In one example, the one or more buttons may receive an input, such as a request for automatic operation to perform one or more tasks.

Various sensors may also be provided to observe various conditions associated with the work vehicle 100, and thus, may be considered part of, or otherwise in communication with, control system 110. In some embodiments, various sensors 164 (e.g., pressure, flow or other sensors) may be disposed near the pumps 152 and control valves 154, or elsewhere on the work vehicle 100. For example, sensors 164 may include one or more pressure sensors that observe a pressure within the hydraulic circuit, such as a pressure associated with at least one of the one or more hydraulic cylinders 128, 134. The sensors 164 may also observe a pressure associated with the hydraulic pumps 152. As a further example, one or more sensors 164*a* may be coupled to a respective one of the hydraulic cylinders 128 to observe a pressure within the hydraulic cylinders 128 and generate sensor signals based thereon. Further, one or more sensors 164*b* may be coupled to a respective one of the hydraulic cylinder 134 to observe a pressure within the hydraulic cylinder 134 and generate sensor signals based thereon.

In some embodiments, various sensors may be disposed near the bucket 112. For example, sensors 166 (e.g. inertial measurement sensors) may be coupled near the bucket 112 in order to observe or measure parameters including the acceleration of the boom assembly 114 near the bucket 112 and so on. Thus, the sensors 166 observe an acceleration of the boom assembly 114 near the bucket 112 and generate sensor signals thereon, which may indicate if the boom assembly 114 and/or bucket 112 is decelerating or accelerating.

In some embodiments, various sensors 168 (e.g., rotary angular position sensor 168) may be configured to detect the angular orientation of the bucket 112 relative to the boom assembly 114, or detect various other indicators of the current orientation or position of the bucket 112. Thus, the sensors 168 generally include bucket position sensors that indicate a position of the bucket 112 relative to the boom assembly 114. Other sensors may also (or alternatively) be used. For example, a linear position or displacement sensors may be utilized in place of the rotary angular position sensors 168 to determine the length of the hydraulic cylinder 134 relative to the boom assembly 114. In such a case, the detected linear position or displacement may provide alternative (or additional) indicators of the current position of the bucket 112.

Various sensors 170 (e.g., angular position sensors) may be configured to detect the angular orientation of the boom assembly 114 relative to the frame portion 122, or detect various other indicators of the current orientation or position of the boom assembly 114 relative to the frame 123 of the work vehicle 100. Thus, the sensors 170 generally include boom position sensors that indicate a position of the boom assembly 114 relative to the frame 123 of the work vehicle 100. Other sensors may also (or alternatively) be used. For example, a linear position or displacement sensors may be utilized in place of the angular position sensors 170 to determine the length of the hydraulic cylinders 128 relative to the frame portion 122. In such a case, the detected linear position or displacement may provide alternative (or additional) indicators of the current position of the boom assembly 114.

With reference to FIG. 1, various sensors 172, 174, 176, 178 may also be disposed on or near the frame 123 of the work vehicle 100 in order to measure various parameters associated with the work vehicle 100. In one example, sensor 172 observes a speed of the work vehicle 100 and generates sensor signals based thereon. Sensor 174 observes a speed of one or more of the driven wheels 150 of the work vehicle 100 and generates sensor signals based thereon. Sensor 176 observes a speed of the engine 144 of the work vehicle 100 (e.g. a tachometer) and generates sensor signals based thereon. Sensor 178 observes an acceleration of the frame 123 of the work vehicle 100, and generates sensor signals based thereon.

In certain embodiments, one or more location-sensing devices may also be included on or associated with the work vehicle 100. For example, a GPS device 180 may use GPS technology to detect the location of the work vehicle 100 at regular intervals (e.g., during a loading operation). The detected locations may then be communicated via a suitable wired or wireless interface, such as a CAN bus, to the control system 110 associated with the work vehicle 100. In certain embodiments, the detected locations may additionally (or alternatively) be communicated to one or more remote systems.

In one example, the work vehicle 100 also includes an image sensor 190 to collect image data from the environment of the work vehicle 100. For example, the image sensor 190 collects images associated with the positions and/or obstacles within the work vehicle environment.

In this example, the image sensor 190 includes a camera assembly, which observes an area within the environment and generates image data based thereon. It should be noted that while the following description refers to a "camera assembly," any suitable visual sensor may be provided. Moreover, the image sensor 190 can comprise a lidar, radar or similar sensor that observes an object and a distance to an object and generates sensor signals based thereon. In certain embodiments, an image sensor 190 may be mounted to or associated with the work vehicle 100 (or otherwise positioned) in order to capture images at least of a field of view that is forward of the work vehicle 100. The image sensor 190 may be in electronic (or other) communication with the control system 110 (or other devices) and may include various numbers of cameras of various types. In certain embodiments, the image sensor 190 may include a color camera capable of capturing color images; an infrared camera to capture infrared images; a grayscale camera to capture grayscale images; and/or stereo camera assembly capable of capturing stereo images.

Images may be captured by the image sensor 190 according to various timings or other considerations. In certain embodiments, for example, the image sensor 190 may capture images continuously or at regular time intervals as the work vehicle 100 executes various tasks.

The image sensor 190 provides a source of local image data for the control system 110 associated with the work vehicle 100. It will be understood that various other sources of image data for the control system 110 may be available, including a portable electronic device (not shown) external to, but in communication with, the work vehicle 100 to transmit data to a vehicle communication device (not shown).

In various embodiments, the control system 110 outputs one or more control signals or control commands to various actuators of the work vehicle 100 to perform functions. For example, the control system 110 may generate suitable commands to the hydraulic cylinders 128, 134, pumps 152, and/or control valves 154 for operation of the bucket 112 and/or boom assembly 114 based on one or more of the sensor signals received from the sensors 164-178, image data received from the image sensor 190; location data received from the GPS device 180; input received from the human-machine interface 156; and/or further based on the automated control system and method of the present disclosure. Similarly, in some embodiments, the control system 110 also outputs the one or more control signals or control commands to the engine control module 144a, the transmission control module 146a, the steering control module 148a, and the braking control module 149a to respectively control operation of the engine 144, transmission 146, steering system 148, and braking system 149, based on one or more of the sensor signals received from the sensors 164-178; location data from GPS device 180; image data received from the image sensor 190; input received from the human-machine interface 156; and/or further based on the automated control system and method of the present disclosure.

Generally, in some embodiments, the control system 110 may operate in a typical manner with an operator providing a series of manual individual inputs at the interface 156. However, the control system 110 may also implement automated operation, as will be described in greater detail below.

Figure 3:
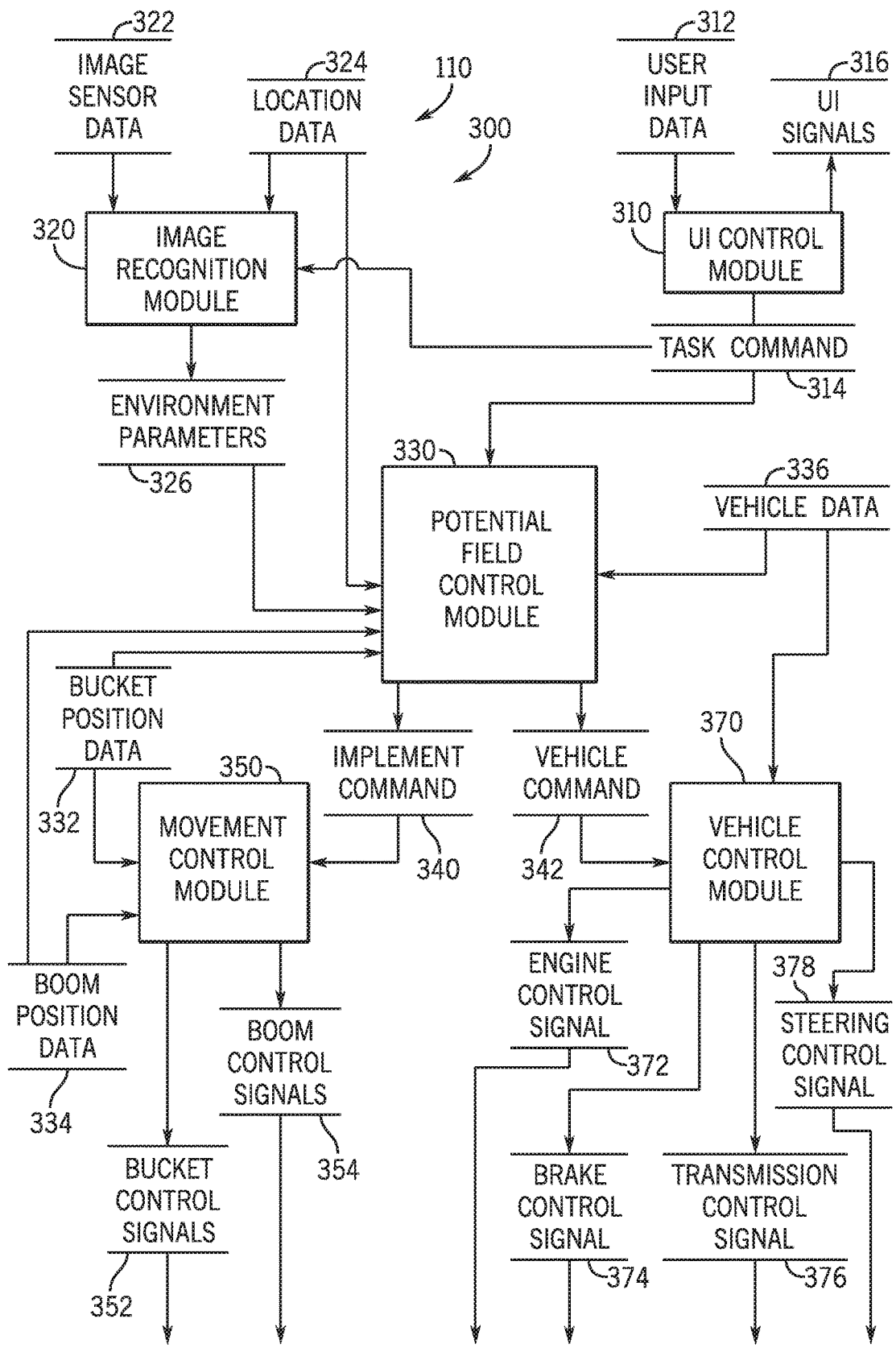
FIG. 3 is a dataflow diagram illustrating an example control system of the work vehicle of FIG. 1 in accordance with an example embodiment.

Referring now also to FIG. 3, a dataflow diagram illustrates various embodiments of an automated control system 300 for the work vehicle 100, which may be incorporated into control system 110. For example, various embodiments of the automated control system 300 according to the present disclosure may include any number of modules embedded within the control system 110. As can be appreciated, the modules shown in FIG. 3 can be combined and/or further partitioned to similarly control the various components of the work vehicle 100 discussed above. In various embodiments, the automated control system 300 includes a user interface (UI) control module 310, an image recognition module 320, a potential field control module 330, an implement control module 350, and a vehicle control module 370. As described below, the modules 310, 320, 330, 350, 360 of automated control system 300 function to generate control signals 352, 354, 372, 374, 376, 378 for operating the work vehicle 100 based on one or more of user input data 312, image sensor data 322, location data 324, vehicle data 316, bucket and boom position data 332, 334, and any other relevant data. Collectively, one or more instances of this data considered by the automated control system 300 may be referred to as "input data" or "input parameters."

The UI control module 310 receives user input data 312 from the human-machine interface 156. The input data 312 may include, for example, a command for automated operation of the work vehicle 100 to perform one or more tasks. As introduced above, examples of such tasks include loading and unloading material, transporting materials, and avoiding obstacles. The UI control module 310 interprets the user input data 312 and sets a task command 314 for the potential field control module 330. The UI control module 310 may also present information about the automated control system 300, for example, by outputting UI signals 314 to a display device.

The image recognition module 320 may receive image sensor data 322 as input from image sensor 190, and in some instances, may also receive the task command 314. The image recognition module 320 processes the image sensor data 322 to determine various parameters associated with the designated task, such as recognition and identification of elements within the environment, including the loading and unloading positions and obstacles, as described below.

In one example, the image recognition module 320 processes the image sensor data 322 from the image sensor 190 that collects visual information regarding the environment. The image recognition module 320 evaluates the visual information to identify an element of interest, such as a loading position, an unloading position, and any obstacles. This identification may be performed, for example, by image or feature matching. Upon identification, the image recognition module 320 may determine additional information regarding the element, such as the location and/or position of the element, in absolute coordinates and/or relative to the work vehicle 100. Other information that may be provided by the image recognition module 320 includes size (e.g., height, width, depth) and kinematic state (e.g., static or in motion; direction, speed, and/or acceleration of motion) of the element. The image recognition module 320 may make these determinations with respect to the overall work vehicle 100 or more specific components of the work vehicle 100, such as linkages of the boom assembly 114, bucket 112, or even the container 112a or side wall edge 112b of the bucket 112. Collectively, the output of the image recognition module 320 may be considered environment parameters 326 provided to the potential field control module 330.

In some instances, the image recognition module 320 additionally make the determinations based on input location data 324 with the location of the work vehicle 100, as detected by the GPS device 180. In some instances, the location of the work vehicle 100 is provided to the image recognition module 320 in 3D world coordinates.

Generally, the potential field control module 330 receives the task command 314 from the UI control module 310 and functions to implement the associated task or tasks. The potential field control module 330 may receive additional inputs from a number of sources. For example, the potential field control module 330 may receive the environment parameters 326 from the image recognition module 320. Additional inputs to the potential field control module 330 may include the location data 324 from the GPS device 180 and/or from the image recognition module 320.

In some embodiments, the potential field control module 330 may also receive the bucket position data 332 and boom position data 334 that includes sensor data from, as examples, sensors 164, 166, 168, 170. As specific examples, the bucket position data 332 includes the sensor signals or sensor data from the sensor 168, which indicates a position of the bucket 112 relative to the boom assembly 114, and the boom position data 334 includes the sensor signals or sensor data from the sensor 170, which indicates the angular orientation of the boom assembly 114 relative to the frame portion 122.

The potential field control module 330 further receives vehicle data 336. Vehicle data 336 may include any relevant information associated with the work vehicle 100 from the various sensors, other control modules, and/or other systems. Examples include vehicle speed, engine data, transmission data, brake data, steering data, and the like based on sensor data from sensors 172, 174, 176, 178.

As will be described in greater detail below, the potential field control module 330 evaluates the input data to determine the state of the work vehicle 100, determine the applicable potential field functions (or maps) for the state, calculates an action vector based on the potential field functions, and generates commands 340, 342 to implement the action vector. Additional details regarding the structure and operation of the potential field control module 330 will be provided below.

In one example, the potential field control module 330 generates an implement command 340 and a vehicle command 342, which collectively may be referred to as an actuator command. Generally, the implement command 340 represents the desired action of the bucket 112 and boom assembly 114, such as a direction, magnitude, and timing of one or more movements. Generally, the vehicle command 342 represents the desired action of the work vehicle 100, such as the direction, magnitude, and timing of a driving operation (e.g., propulsion, steering, braking, etc.).

As input, the implement control module 350 receives the implement command 340, and may also receive the bucket position data 332 and the boom position data 334. In response, the implement control module 350 generates boom control signals 352 and bucket control signals 354 based on the implement command 340, the bucket position data 332, and the boom position data 334. In effect, the implement control module 350 generates the control signals 352, 354 to carry out the implement command 340. For example, the control signals 352, 354 may include one or more control signals for the pumps 152 and/or control valves 154 to actuate the hydraulic cylinders 128, 134 to move the boom assembly 114 and bucket 112. As a result of the boom and bucket control signals 352, 354, the bucket 112 is maneuvered into the proper positions to perform the desired task (e.g., loading material, carrying material, and/or dumping material).

As input, the vehicle control module 370 receives the vehicle command 342, and may also receive the vehicle data 336. In response, the vehicle control module 370 generates engine control signals 372, brake control signals 374, transmission control signals 376, and steering control signals 378. In effect, the implement control module 350 generates the control signals 372, 374, 376, 378 to carry out the vehicle command 342. For example, the control signals 372, 374, 376, 378 may include one or more control signals for the control modules 144a, 146a, 148a, 149a to operate the work vehicle 100, such as maneuvering to and from various positions in the environment and avoiding obstacles.

Figure 4:
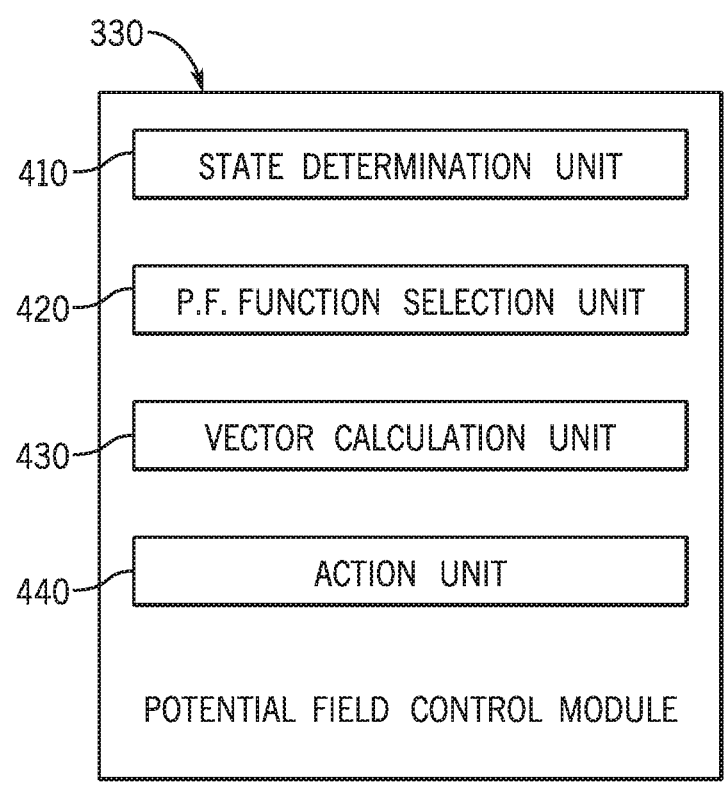
FIG. 4 is a functional block diagram of a potential field module of the control system of the work vehicle of FIG. 1 in accordance with an embodiment.

FIG. 4 is a functional block diagram of the potential field control module 330 in accordance with an embodiment. One or more aspects of the potential field control module 330 may be organized as sub-modules or units that perform the respective functions described below. In other embodiments, the potential field control module 330 may have a different organization. As shown, the potential field control module 330 may be considered to include a state determination unit 410, a potential field function selection unit 420, a vector calculation unit 430, and an action unit 440. Although not shown, the potential field control module 330 may also include or otherwise access a database containing data associated with the various functions described herein. As an introduction and as discussed in greater detail below, the state determination unit 410 functions to determine the state of the work vehicle 100 based on input data and the designated task; the potential field function selection unit 420 functions to select one or more potential field functions based on the state, input data, and designated task; the vector calculation unit 430 functions to calculate an action vector representing the appropriate automated behavior based on the potential field functions and the position of the work vehicle 100; and the action unit 440 functions to implement the action vector in the form of control commands for the components of the work vehicle, thereby resulting in the automated performance of one or more aspects of the task. The input data, task, potential field function, and/or action vector may be associated with one or more components or aspects of the work vehicle 100, such as the entire work vehicle 100 (e.g., to move the entire work vehicle 100) or combinations of the boom assembly 114 and/or bucket 112 (e.g., to scoop material).

Figure 5:
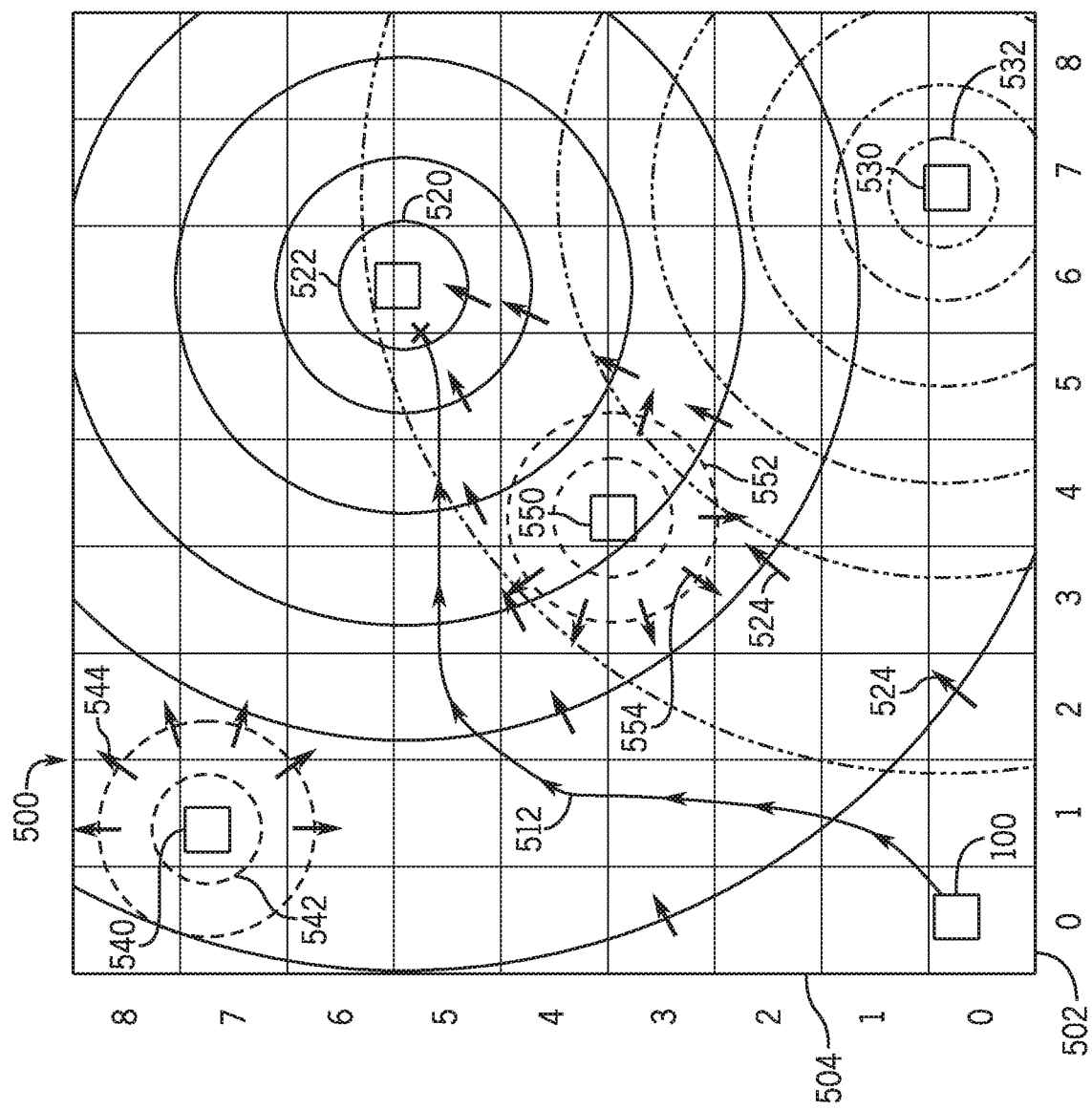
FIG. 5 is a plan view an example environment in which the disclosed automated system may be used.
Figure 6:
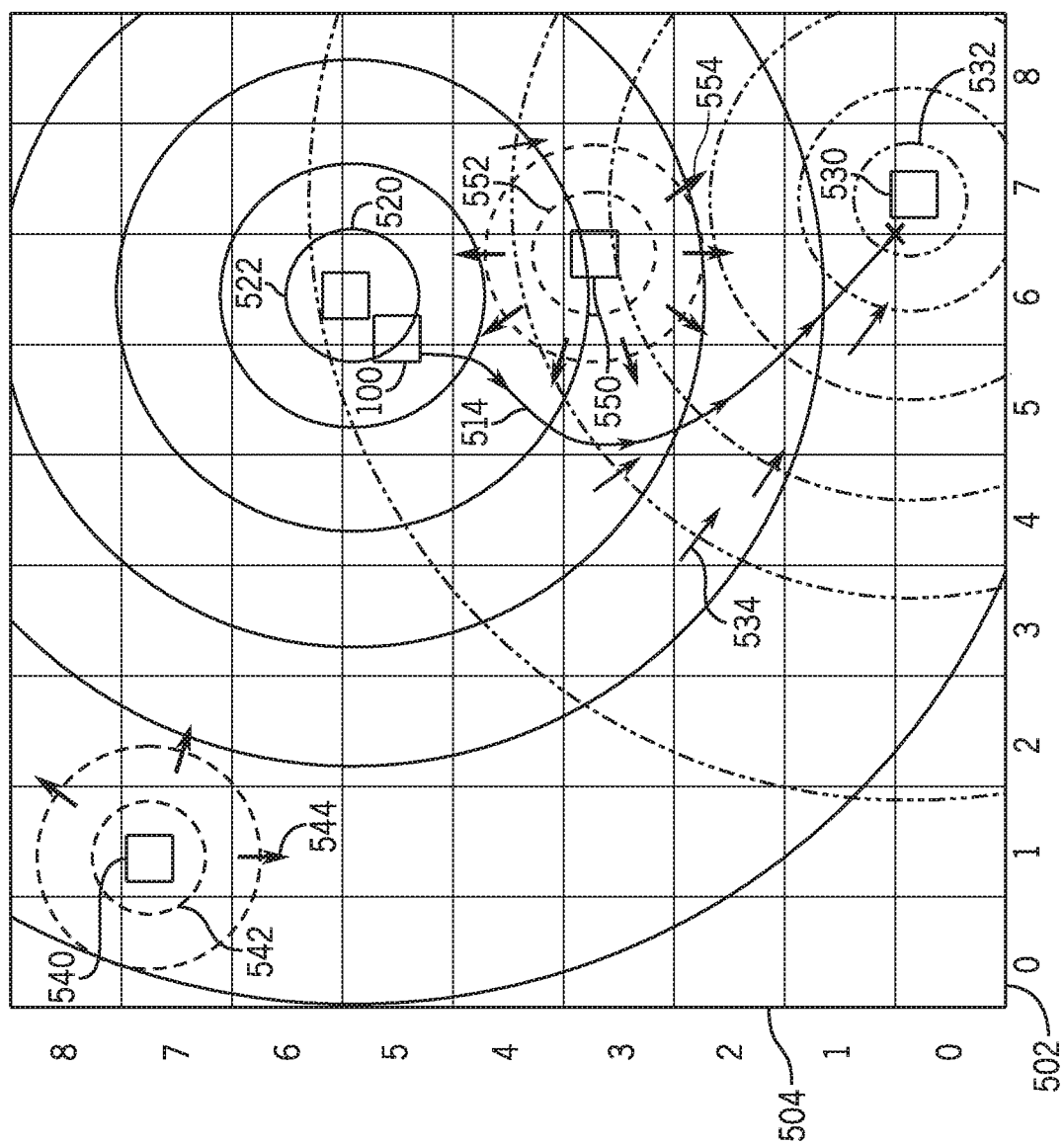
FIG. 6 is a further plan view of another example environment in which the disclosed automated system may be used.

As applicable, FIGS. 5 and 6 will be referenced below in order to provide examples of operation of the potential field control module 330 in various scenarios. FIGS. 5 and 6 depict two-dimensional plan views of an environment 500 in which the work vehicle 100 operates to perform one or more tasks. In the depicted example, the task of the work vehicle 100 is to move material from a loading position 520 to an unloading position 530 in a safe and efficient manner. In each, the x-axis 502 and y-axis 504 are labeled to enable reference to specific, otherwise unlabeled positions within the environment 500. Generally, FIG. 5 represents operation of the work vehicle 100 traveling from an initial position (0,0) to a loading position 520 while avoiding obstacles 540, 550. At the loading position 520, the work vehicle 100 is configured to collect material, such as by scooping the material in a bucket. Upon collecting sufficient material, the work vehicle 100 is configured to travel to the unloading position 530, such as the location of a receptacle. FIG. 6 is a similar view as work vehicle 100 travels from the loading position 520 to the unloading position 530 while avoiding obstacles 540, 550. Upon arriving at the unloading position 530, the work vehicle 100 is configured to dump the material. Subsequently, the work vehicle 100 may repeat the series of tasks, or undertake additional tasks.

As introduced above and discussed in greater detail below, one or more features or elements of the environment 500 may be associated with a potential field function, which may be expressed as a potential field map over an array of distances. For discussion purposes, FIGS. 5 and 6 depict potential field map 522 associated with the loading position 520, potential field map 532 associated with the unloading position 530, and potential field map 542, 552 associated with obstacles 540, 550. As also noted above, each potential of the potential field maps 522, 532, 542, 552 may be considered to have positive values as attractive behaviors or negative values as repulsive behaviors relative to the state of the work vehicle 100. These values are schematically represented for maps 522, 532, 542, 552 by arrows 524, 534, 544, 554.

Returning to FIG. 4, in one embodiment, the state determination unit 410 receives and evaluates the input data of the potential field control module 330 and determines the state of the work vehicle 100. Generally, the state represents the current status of the vehicle 100 in view of the task command 314 based on, as examples, the location of the work vehicle 100, the positions of the bucket 112 and boom assembly 114, the amount of material in the bucket 112, and any other relevant information that may be derived from the various types of inputs discussed above. For example, in FIG. 5, since the work vehicle 100 is unloaded and at a distance from the loading position 520, the state of the work vehicle in FIG. 5 is "travel to loading position".

The function selection unit 420 receives the state and determines the potential field function (or functions) associated with the state. As noted above, each potential field may be represented by a potential field function that maps potential as a function of spatial relationship, which is distance in this example. In the particular example of FIG. 5, in which the work vehicle 100 is traveling to position 520, the relevant potential field functions are represented by map 522 associated with position 520, map 542 associated with obstacle 540, and map 552 associated with obstacle 550. As such, the function selection unit 420 selects the functions represented by maps 522, 542, 552. In effect, multiple potential field functions (or "layers" of potential field functions) may be combined to create an overall strategy based on competing factors or considerations. It should also be noted that, in the example of FIG. 5, the function selection unit 420 does not select the function represented by map 532 associated with position 530 since the position 530 is not relevant to the current state, e.g., because the work vehicle 100 is traveling to position 520, not position 530.

The vector calculation unit 430 calculates the action vector for the current state and position based on the selected potential field function or functions. Generally, each selected potential field function may have an impact on behavior, and as such, each selected potential field function may form a component contributing to the action vector. Accordingly, the action vector is a summation of the action vector components calculated from each function, e.g., as the gradients of the potential field of the respective position.

Again referring to FIG. 5, the vector calculation unit 430 calculates the action vectors for the work vehicle at position (0,0) based on functions represented by maps 522, 542, 552. In this example, the functions of maps 542, 552 have negative contributions (e.g., acting as a repulsive force) since the obstacles 540, 550 represent undesirable interactions, while the function of map 522 has a positive contribution (e.g., acting as an attractive force) since the position 520 is a desirable interaction for the work vehicle 100. In the particular position (0,0), the action vector contributions of the functions of maps 542, 552 are relatively small considering the relative distances between the work vehicle 100 and obstacles 540, 550. The action vector contribution of the function of map 522 results in an overall action vector directed generally toward position 520. As noted above, the action vector typically represents a direction of movement, and in some embodiments, also includes a velocity of movement. In this example, the action vector commands the work vehicle 100 to move from position (0,0) to position (1,1).

It should be noted that the action vector components across the entire environment 500 are not calculated. In other words, in one embodiment, the entire map of action vectors is not actually generated, just components for the immediate position of the work vehicle 100.

Returning to FIG. 4, the action unit 440 functions to implement the action vector by generating the appropriate implement commands 340 and/or vehicle commands 342. For example, in the scenario of FIG. 5, the action unit 440 generates the vehicle commands 342 necessary to move from position (0,0) to position (1,1). As noted above and additionally referring to FIG. 3, the control system 110 then generates the necessary system control signals 372, 374, 376, 378 to carry out the vehicle command 342, thereby resulting in the work vehicle 100 making the desired movement.

Typically, the automated control system 300 operates in an iterative or continuous manner. In other words, upon moving to position (1,1), the state determination unit 410 reevaluates the current state, the function selection unit 420 selects the appropriate functions, the vector calculation unit 430 recalculates the action vector, and action unit 440 implements the action vector by generating implement and/or vehicle commands 340, 342. In FIG. 5, the progress of the work vehicle to position 520 through these iterations is represented by path 512. In FIG. 5, the state of traveling to position 520 (with the associated selected functions represented by maps 522, 542, 552) is maintained until the work vehicle 100 arrives at position 520.

Upon reaching position 520, input data to the potential field control module 330 is such that the state determination unit 410 changes state to a loading operation. For example, the input data may indicate that the proximity of the work vehicle 100 to the material at the loading position 520 is such that loading is appropriate. In the loading operation, the work vehicle 100 collects materials in the bucket 112, e.g., by appropriately positioning, scooping, and lifting the bucket 112 through the material. This function may be performed in any suitable manner, including manually or in accordance with an automated system and method. In one embodiment, discussed in greater detail below, the automated control system 300 may perform this function based on potential fields.

Upon filling bucket 112 with material, input data to the potential field control module 330 is such that the state in the state determination unit 410 may change to "travel to unloading position". This state is generally represented by FIG. 6. In this state, the function selection unit 420 selects functions represented by maps 532, 542, 552 as the relevant potential field functions. In one example, the function represented by map 522 associated with the loading position 520 is not selected, although in some instances, the state of the loaded bucket 112 may result in a potential field function with negative potential such that the work vehicle 100 is repelled by the loading position 520. As above, the vector calculation unit 430 calculates the action vector components for the functions represented by maps 532, 542, 552, such as vector components away from obstacles 540, 550 and vector components toward position 530; and the action unit 440 generates the corresponding implement and/or vehicle commands 340, 342 such that the work vehicle 100 travels to position 530, as indicated by path 514.

As also indicated in FIG. 6, obstacle 550 has moved during performance of the task. However, the potential field function represented by map 552 is associated with obstacle 550, regardless of position. In effect, the automated control system 300 recognizes the obstacle 550 (e.g., based on image sensor data 322) and determines the updated position of the obstacle 550 relative to the work vehicle 100 such that an accurate action vector component may be calculated to avoid obstacle 550. Similarly, positions 520, 530 and obstacle 540 may be static or vary over time.

FIGS. 5 and 6 demonstrate the overall movement of the work vehicle 100 according to the automated control system 300, generally such that the work vehicle 100 travels between positions. However, the automated control system 300 may also be implemented with other task functions that involve one or more individual components of the work vehicle 100. In such situations, the position of the element (e.g., either as a goal position or an obstacle position) may be defined with sufficient detail in order to perform more intricate tasks. For example, the positions and relative distances may be defined in three dimensions in order for a work vehicle to appropriately manipulate individual components to perform a number of functions that form the overall task. Additionally, the states, potential field functions, and/or respective work vehicle components may vary to perform the overall task.

Figure 7:
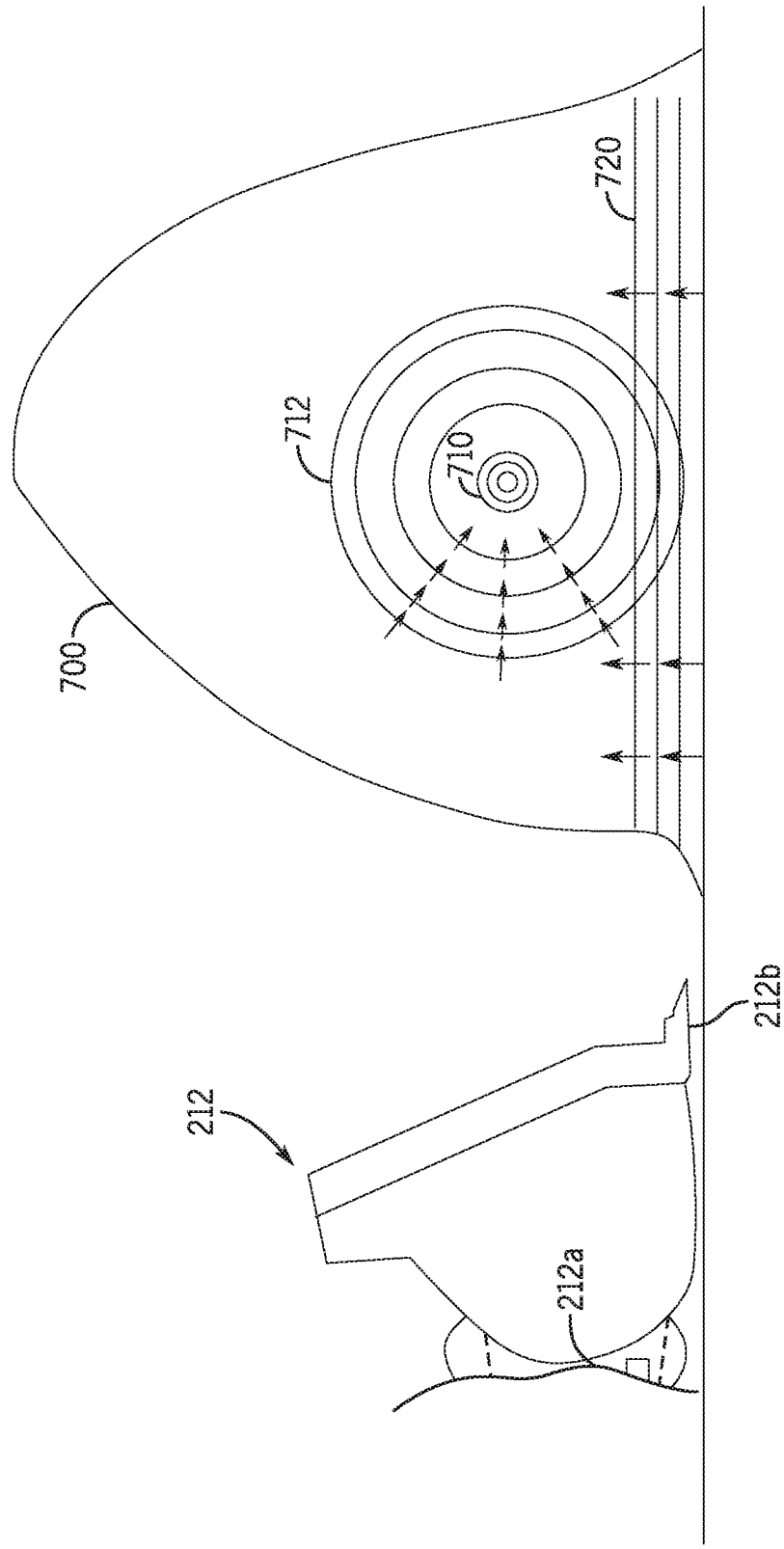
FIG. 7 is a side view of another example environment in which the disclosed automated system may be used.

As one example, the automated control system 300 may be used to load material into the bucket 112 and unload material from the bucket 112. An example is provided by FIG. 7 that depicts the work vehicle 100 approaching a pile of material 700 to load the bucket 112 with material. As above, the automated control system 300 may determine the current state of the work vehicle 100, which in this case may include the state of the bucket 112 based on factors such as the height and orientation of the bucket, whether or not the bucket 112 contains any material, and characteristics of the material 700. For example, in the scenario depicted in FIG. 7, the bucket 112 is empty with the opening of the bucket 112 oriented towards the pile of material 700. Also as above, the function selection unit 420 selects one or potential field functions based on the state. In the state of FIG. 7, the function selection unit 420 selects the function represented by map 712. In one embodiment, the vector calculation unit 430 calculates the action vector based on a particular component, such the container 112a or side wall edge 112b of the bucket 112 and/or one or more linkages of the boom assembly 114. For example, the action vector is calculated based on the spatial relationship (e.g. the three-dimensional distance) of the respective component and the goal position, which in this case is the center of the material 700 represented by map 712. In some cases, each work vehicle component may be considered with respect to a potential field function for an individual or cooperative operation. In this example, the resulting action vector selected by the vector calculation unit 430 indicates that the bucket edge 112b is attracted to a position 710 at the center of the material 700 based on an associated function represented by map 712, and suitable implement and vehicle commands 340, 342 are generated, e.g., such that the bucket 112 moves forward into the pile of material 700. Although not shown, the scenario in FIG. 7 may also include obstacles associated with additional potential field functions for consideration. Such obstacles may include, as examples, the sides of a container, overhanging elements, elements on the ground, rocks, and the like that result in action vector components that avoid the respective positions of these elements.

Again, operation of potential field control module 330 may be iterative. As such, upon reaching a certain position or condition, the state, function, and/or action vector may be reevaluated based on additional input data. For example, upon receiving sufficient material 700 and/or reaching position 710, the state may change such that the function of map 720 is selected relative to one or more components of the work vehicle 100 to generate updated commands 340, 342. Continuing this example, the function of map 720 may initially be considered with respect to edge 112b. For example, upon engaging the material, the state, map, and action vector may change such that the edge 112b is repelled relative to the ground, followed by the side wall edge 112b being repelled relative to the ground, thereby resulting in a scooping and lifting action of the bucket 112 relative to the pile of material 700. Eventually, the bucket 112 is loaded, thereby resulting in input that changes the state of the work vehicle 100 to travel to the unloading position 530 (FIG. 6).

In an unloading process, the potential field control module 330 may operate in a similar manner. For example, at a predetermined position of the bucket 112 relative to the ground or receptacle, the state, map, and action vector results in a reorientation and dumping of the bucket 112.

The discussion above refers to four example states, including: navigating to a first position, navigating to a second position, loading, and unloading. Other states may include a waiting state (e.g., in a queue), in transit (e.g., to a site), idle (e.g., not currently in use), down (e.g., not currently usable), and other work tasks or functions.

Although the embodiments above are discussed with respect to a loader, other types of vehicles may use similar automated control systems, independently or in cooperation with one another. As an example, the unloading position 530 may be associated with a dump truck or other type of receptacle vehicle. The dump truck may have an automated system in which the state is based on the amount of material in the bed of the truck. When the state is a partially filed bed, the automated control system may use potential field functions to reorient the truck relative to the loader vehicle to provide more efficient access; or when the state is a filled bed, the automated control system may use potential field functions to travel to another work position.

In further embodiments, the state of the work vehicle 100 may be based on additional factors that are external to the work vehicle 100, including cooperation among multiple vehicles and other fleet management operations. One such example is depicted in FIG. 8, which is an environment 800 with a number of work vehicles 820-822, 830-832 performing functions associated with three different types of materials 840-842.

Figure 8:
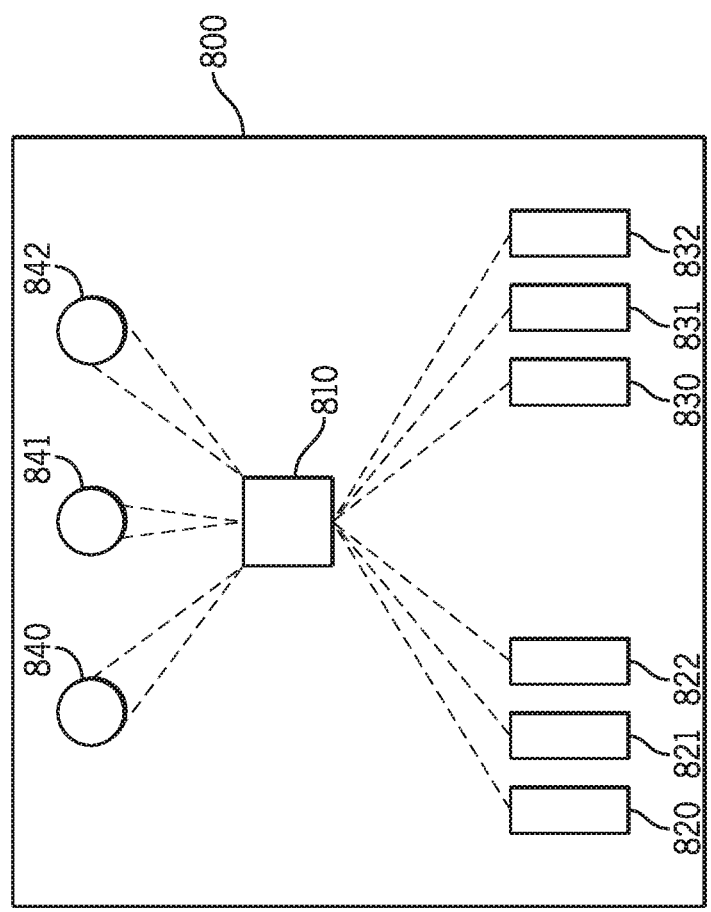
FIG. 8 is a further plan view of yet another example environment in which the disclosed automated system may be used.

In one example, the environment 800 of FIG. 8 may have a control center 810 in which an automated control system such that as discussed above may be incorporated. Although FIG. 8 depicts the control center 810 as a separate element, the control center 810 may be a distributed system across one or more of the vehicles 820-822, 830-832. In any event, the control center 810 may generate and send appropriate actuator commands (e.g., commands corresponding to commands 340, 342 discussed above) to each of the vehicles 820-822, 830-832 for performance of a task. As an example, in FIG. 8, the task generally includes using the loader work vehicles 820-822 to load materials 840-842 into truck work vehicles 830-832 in a generally evenly distributed manner.

As above, the control center 810 may determine a state for each vehicle 820-822, 830-832; select one or more potential field functions based on the state for each vehicle 820-822, 830-832; generate an action vector for each vehicle 820-822, 830-832; and generate the actuator commands for each vehicle 820-822, 830-832 to implement the corresponding action vector. The state and potential field functions for each vehicle 820-822, 830-832 may be based not only on the input data discussed above, but also based on the status of each of the other vehicles 820-822, 830-832 and/or other parameters within the environment. For example, when the state, potential field function, and action vector for loader vehicle 820 results in loader vehicle 820 being directed to material 840, the control center 810 may determine the state of loader vehicle 821 to result in a potential field function that is more strongly attracted to material 841 or material 842 than material 840. In other words, since vehicle 820 is already progressing to material 840, the control center 810 modifies either the state or the potential field functions for the other vehicles (e.g., vehicle 821) to encourage those vehicles to more efficiently perform the overall task. Similar operation may occur with truck work vehicles 830-832, for example, to determine the most efficient manner of transferring material between vehicles 820-822 to vehicles 830-832 (e.g., where and how to navigate in a manner to more efficiently perform the overall task).

The control center 810 may also determine the state and/or select associated potential field functions based on the amount or nature of the material 840-842. For example, the control center 810 may monitor the amount of each type of material 840-842, and as the amount of one type of material 840 decreases, the potential field functions associated with the other types of materials 841, 842 may be increased to more strongly attract the vehicles 820-822, 830-832 (or the potential field function of material 840 may be decreased as the material 840 is depleted), thereby more evenly distributing the materials 840-842. Similar operation may occur to adjust the potential field functions based on, for example, the need for a particular type of material at a work site. In effect, the control center 810 may assign potential field functions to the materials 840-842 to force reallocation of vehicle resources to seek out the highest value material that may vary over time.

Although FIG. 8 is depicted to include a control center 810, such a control center 810 may be omitted in some embodiments, and a generally similar operation may occur with respect to an automated control system in each individual work vehicle 820-822, 830-832. In such an embodiment, the vehicles 820-822, 830-832 may communicate states and other information to one another to enable additional coordination. Such information may be considered by each vehicle 820-822, 830-832 to determine individual states, potential field functions, and action vectors in performance of the task. For example, if vehicle 821 receives a message from vehicle 820 indicating that the state of vehicle 820 is such that vehicle 820 is moving toward material 840, vehicle 821 may determine a state and associated potential field functions such that vehicle 821 moves towards one of the other materials 841, 842. In combinations of multiple vehicles, this enables improved fleet and job management by varying the states and potential field functions.

In further embodiments, tasks other than moving material may be provided. For example, the automated control system may be implemented with a feller vehicle in which potential field maps may be associated with trees and landing areas for cutting and transporting trees.

In further embodiments, the automated control system described above may be implemented as an automated control method. For example, in an initial step, a task command may be received. In a further step, task parameters and associated input data may be generated or received. Subsequently, a state is determined; potential field functions are selected; an action vector is calculated; and appropriate commands are generated to carry out the action vector. The process is repeated until the designated tasks are complete.

Accordingly, potential fields may be used in an automated control system to perform various tasks, including navigating through an environment, control of implements or linkages of implements, collision avoidance, machine allocation and fleet management, and machine coordination. Embodiments enable relatively simple control rules, emergent behavior, state-based and layered operation, and adaption to changing environmental conditions.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An automated control system in a work vehicle for automating operation of a first task and a second task, the work vehicle having a frame, propulsion system coupled to the frame and configured to move the work vehicle while avoiding a first obstacle at an obstacle position as the second task, and an implement arrangement coupled to the frame and configured to load a material as the first task, the control system comprising:
one or more electronic controllers having processing and memory architecture including:
a potential field module having:
a state determination unit configured to determine a state of the work vehicle based, at least in part, on input data of a load condition of the work vehicle;
a potential field function selection unit in communication with the state determination unit and configured to select a potential field function based on the determined state, wherein the potential field function selection unit is configured to select the potential field function to include a first potential field function representing at least a portion of the first task and a second potential field function representing at least a portion of the second task;
a vector calculation unit in communication with the potential field function selection unit and configured to calculate a resulting action vector as a gradient of the potential field function with a magnitude representing a relative strength of potential and a direction representing an orientation and sign of the potential for the work vehicle, wherein the relative strength of potential for the first potential field function is based on a first task distance between a portion of the implement arrangement and a first task goal position within a pile of the material and the orientation and sign of the potential for the work vehicle functions as an attractive force towards the first task goal position, and wherein the relative strength of potential for the second potential field function is based on a second task distance between the position of the work vehicle and the obstacle portion and the orientation and sign of the potential for the work vehicle functions as a repulsive force away from the obstacle position;
wherein the vector calculation unit, in performance of the first and second task, calculates the resulting action vector as the sum of a first action vector component as a gradient of the first potential field function and a second action vector component as a gradient of the second potential field function; and
an action unit in communication with the vector calculation unit and configured to generate an actuator command based on the resulting action vector in three dimensions such that the work vehicle maneuvers around the obstacle position while traveling to the first task position; and
an actuator control module in communication with the potential field module and configured to receive the actuator command and to generate command signals for an actuator of the work vehicle to, at least in part, perform the first task.

2. The automated control system of claim 1, further comprising an image recognition module in communication with the potential field module and configured to receive image sensor data and to generate environmental parameters associated with the first and second tasks, the environmental parameters including identification of one or more of the first task goal position and the obstacle position.

3. The automated control system of claim 1, further comprising a user interface (UI) control module in communication with the potential field module and configured to receive the task for the work vehicle from a user.

4. The automated control system of claim 1, wherein the state determination unit is configured to, upon receipt of input data, update the state of the work vehicle based on the input data, the potential field function selection unit is configured to update the potential field function based on the updated state, the vector calculation unit is configured to update the resulting action vector based on the updated potential field function, and the resulting action vector is configured to update the actuator command based on the updated resulting action vector.

5. A work vehicle, comprising:
a frame;
a propulsion system coupled to the frame and configured to move the work vehicle;
an implement arrangement coupled to the frame and configured to manipulate a material; and
an electronic control system having processing and memory architecture operatively coupled to the propulsion system and the implement arrangement and configured to generate an actuator command to one or more of the propulsion system and the implement arrangement to perform a first task, the control system including:
a potential field module with a state determination unit configured to determine a state of the work vehicle based, at least in part, on input data of a load condition of the work vehicle;
a potential field function selection unit in communication with the state determination unit and configured to select a potential field function based on the state;
wherein the potential field function selection unit is configured to select the potential field function to include a first potential field function representing the first task associated with loading the material from a pile with the implement arrangement and a second potential field function representing an obstacle;
a vector calculation unit in communication with the potential field function selection unit and configured to calculate a resulting action vector based on the potential field function;
wherein the vector calculation unit is configured to calculate the resulting action vector as a sum of a first action vector component representing a gradient of the first potential field function for a task distance between a current implement position and an initial task goal position within the pile of material as a first attractive response and a second action vector component representing a gradient of the second potential field function for an obstacle distance between a current work vehicle position and an obstacle position as a first repulsive response, wherein the vector calculation unit is configured to calculate the resulting action vector in three dimensions such that the work vehicle maneuvers around the obstacle position while traveling to the initial task goal position; and
an action unit in communication with the vector calculation unit and configured to generate the actuator command based on the resulting action vector.

6. The work vehicle of claim 5, wherein the state determination unit is configured to, upon receipt of input data, update the state of the work vehicle based on the input data, the potential field function selection unit is configured to update the potential field function based on the updated state, the vector calculation unit is configured to update the resulting action vector based on the updated potential field function, and the resulting action vector is configured to update the actuator command based on the updated resulting action vector.

7. The work vehicle of claim 5, wherein the implement arrangement includes a bucket, and wherein the input data represents an amount of material in the bucket such that the state determination unit determines the state of the work vehicle based on the amount of material in the bucket.

8. The work vehicle of claim 5, wherein the input data includes input data associated with a status of an other vehicle, and wherein the state determination unit is configured to determine the state based on the status of the other vehicle.

9. A work vehicle, comprising:
a frame;
a propulsion system coupled to the frame and configured to move the work vehicle;
an implement arrangement coupled to the frame and configured to manipulate a material; and
an electronic control system having processing and memory architecture operatively coupled to the propulsion system and the implement arrangement and configured to generate an actuator command to one or more of the propulsion system and the implement arrangement to perform a task, the control system configured to:
  determine a state of the work vehicle based, at least in part, on input data of a load condition of the work vehicle;
  select a potential field function based on the state;
  calculate a resulting action vector representing a gradient that linearly converges based on distance and has a magnitude representing a relative strength of potential and a direction representing an orientation and sign of the potential for the work vehicle; and
  generate the actuator command based on the resulting action vector;
wherein the implement arrangement is a loader vehicle arrangement with a bucket and a boom assembly to manipulate the material;
wherein the task command includes traveling to and loading the material at a first position and traveling to and unloading the material at a second position while avoiding an obstacle at an obstacle position;
wherein, when the input data indicates that the bucket is unloaded and the work vehicle is away from the first position, the electronic control system is configured to determine the state of the work vehicle to be traveling to the first position and avoiding the obstacle position, select the potential field function to include a first potential field function associated with the first position and a second potential field function associated with the obstacle position, and calculate the resulting action vector as the combination of a first action vector component based on the first potential field function in view of a first distance between the work vehicle and the first position and a second action vector component based on the second potential field function in view of a second distance between the work vehicle and the obstacle position such that the work vehicle maneuvers around the obstacle position while traveling to the first position,
wherein, when the input data indicates that the bucket is unloaded and the work vehicle is at the first position, the electronic control system is configured to determine the state of the work vehicle to be initially loading the material, select the potential field function to include a third potential field function associated with a source of the material, and calculate the resulting action vector based on the third potential field function in view of a third distance between the bucket and the source of material in three dimensions such that the bucket is positioned, scooped, and lifted through the material to collect a portion of the material in the bucket,
wherein, when the input data indicates that the bucket is loaded and within the source of material and the work vehicle is at the first position, the electronic control system is configured to determine the state of the work vehicle to be further loading the material, select the potential field function to include a fourth potential field function associated with a ground plane, and calculate the resulting action vector based on the fourth potential field function in view of a fourth distance between the bucket and the ground plane in three dimensions, and
wherein, when the input data indicates that the bucket has completed loading and the work vehicle is away from the second position, the electronic control system is configured to determine the state of the work vehicle to be traveling to the second position and avoiding the obstacle position, select the potential field function to include a fifth potential field function associated with the second position and the second potential filed function associated with the obstacle position, and calculate the resulting action vector as the combination of a third action vector component based on the fifth potential field function in view of a fifth distance between the work vehicle and the second position and the second action vector component based on the second potential field function in view of the second distance between the work vehicle and the obstacle position such that the work vehicle maneuvers around the obstacle position while traveling to the second position.

10. The automated control system of claim 1,
wherein vector calculation unit is configured to calculate the first action vector component such that the gradient of the first potential field function converges linearly along the distance between the at least the portion of the work vehicle and the first goal position; and
wherein vector calculation unit is configured to calculate the second action vector component such that the gradient of the second potential field function converges linearly along the distance between the position of the work vehicle and the obstacle position.

11. The work vehicle of claim 5,
wherein vector calculation unit is configured to calculate the first action vector component such that the gradient of the first potential field function converges linearly along the task distance; and
wherein vector calculation unit is configured to calculate the second action vector component such that the gradient of the second potential field function converges linearly along the obstacle distance.

12. The work vehicle of claim 9,
wherein the electronic control system is configured to is configured to, upon determining the state to be traveling to the first position and avoiding the obstacle position, determine the potential field function for the work vehicle from a current position relative to the first position as a goal position and the obstacle position according to a first expression in which:

$$U(q)=U_{goal}(q)+\Sigma U_{obstacle}(q)$$

wherein:
  U(q) is the potential field function for the work vehicle at the current position,
  $U_{goal}$(q) is the first potential field function defined as first distance between the current position of the work vehicle and the goal position, and
  $\Sigma U_{obstacle}$(q) is the second potential field function defined as the second distance between the current position of the work vehicle and the obstacle position; and
wherein the electronic control system is configured to is further configured to, upon determining the state to be traveling to the first position and avoiding the obstacle position, calculate the resulting action vector at the current position according to a second expression in which:

$$F(q)=-\nabla U(q)=F_{att}(q)+F_{rep}(q)=-\nabla U_{att}(q)-\nabla U_{rep}(q)$$

wherein:
  F(q) is the resulting action vector;
  $\nabla U$(q) is the gradient of the potential field function U(q);
  $F_{att}$(q) is an action vector component representing attractive forces of the first potential field function at the current position;
  $F_{rep}$(q) is an action vector representing repulsive forces of the second potential field function at the current position;
  $\nabla U_{att}$(q) is a gradient of the first potential field function for the attractive forces; and
  $\nabla U_{rep}$(q) is a gradient of the second potential field function for the repulsive forces.

13. The automated control system of claim 1, wherein the implement arrangement includes a bucket, and wherein the relative strength of potential for the first potential field function is based on the task distance between an edge of the bucket and the task goal position within the pile of the material.

14. The automated control system of claim 13, wherein, upon reaching a predetermined position within the pile, the potential field function selection unit is configured to select a second potential field function representing a further portion of the first task, wherein the relative strength of potential for the second potential field function is based on a second task distance between the implement arrangement and the ground such that the resulting action vector results the implement arrangement being repelled by the ground.

* * * * *